No. 713,721. Patented Nov. 18, 1902.
M. O. TROY.
SYSTEM OF ELECTRICAL DISTRIBUTION.
(Application filed May 31, 1902.)

(No Model.)

Witnesses.
George H. Tilden
Helen A. Ford

Inventor.
Matthew O. Troy.
by Albert G. Davis
Atty.

UNITED STATES PATENT OFFICE.

MATTHEW O. TROY, OF LYNN, MASSACHUSETTS, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 713,721, dated November 18, 1902.

Application filed May 31, 1902. Serial No. 109,596. (No model.)

*To all whom it may concern:*

Be it known that I, MATTHEW O. TROY, a citizen of the United States, residing at Lynn, county of Essex, State of Massachusetts, have invented certain new and useful Improvements in Systems of Electrical Distribution, (Case No. 2,631,) of which the following is a specification.

In alternating-current systems it is possible to transform a current of constant potential into a current of constant volume or the reverse by the use of certain combinations of reactance of opposite signs. Various combinations for effecting this purpose are now known to the art. Some of the combinations of reactances which are appropriate for this purpose are, however, open to the objection that the condensers or other devices having the effect of capacity are apt to magnify the harmonics of the alternating-current wave at the expense of the fundamental wave. If this action takes place to any considerable extent, the automatic regulation of the system may be very seriously impaired. In order to overcome this objectionable feature, I insert directly in series with the condenser or each condenser of such a system a small inductance-coil or similar device for damping out the harmonics in the current-wave flowing through the condenser, the condenser at the same time being slightly increased in capacity to balance the inductance presented by the inductance-coil thus inserted. By this arrangement the transformation system becomes independent of harmonics in the alternating-current wave, so that an otherwise unstable system may be transformed into a practically valuable system by the use of the means which I have briefly described.

The novel features which I believe characterize my invention I have pointed out with particularity in the appended claims, while the invention itself I have endeavored to make clear by the following description, which is to be taken in connection with the accompanying drawings, in which—

Figure 1:
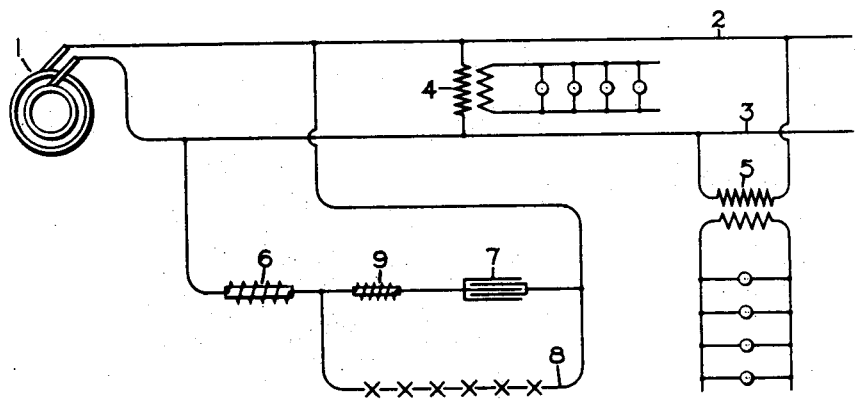
Figure 2:
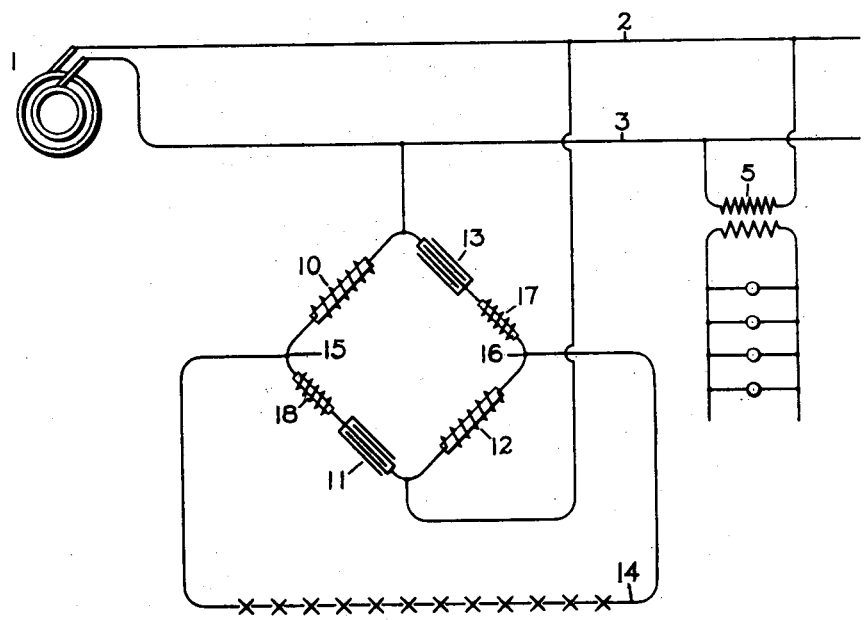

Figure 1 represents one embodiment of my invention, and Fig. 2 a modification.

In Fig. 1 a source of single-phase alternating current is indicated at 1, from which extend supply-mains 2 and 3 for conveying current to any suitable translating devices. As illustrative of such translating devices I have indicated transformers 4 and 5 for supplying current to banks of lamps. In order to transform the constant-potential current derivable from the supply-mains 2 and 3 into current of constant volume, I may make use of a variety of combinations of reactances of opposite sign. One of these combinations, which is shown in Fig. 1, consists of an inductance-coil 6 in series with a condenser 7 across the mains 2 and 3, the reactance of the inductance-coil being for the purpose of securing constant-current transformation of the same value as the reactance of the condenser. The constant-current circuit (indicated at 8) is shunted across either the condenser or the inductance-coil, but in this case is shown as shunted across the condenser. In order to suppress harmonics in the current-wave impressed upon the condenser, I include in series therewith and between the points of connection of the constant-current circuit 8 a relatively small inductance-coil 9. This inductance-coil has the effect of weeding out the harmonics in the current-wave, thereby preventing an otherwise preponderating reaction thereon by the condenser, which would have the effect of greatly impairing regulation of the system, since there would be no coöperating reaction on these harmonics by the main inductance-coil 6 of the transforming system. To compensate for the presence of the auxiliary inductance-coil 9, the condenser is made of somewhat larger capacity than would be required without the presence of the coil 9. The arrangement which I have thus described is by the presence of the inductance for suppressing harmonics rendered practically operative, while without the presence of this device the arrangement would be impracticable.

Fig. 2 differs from Fig. 1 in that it shows a somewhat different form of constant-current transforming device. As in Fig. 1, the source of constant-potential alternating current is indicated at 1 and the supply-mains extending therefrom at 2 and 3, from which translating devices—such, for example, as a transformer 5 with current-consuming devices in its secondary circuit—may receive current. The constant-current transforming apparatus is in a certain sense a combination of two of the sets shown in Fig. 1. Thus an inductance-coil 10 and its coöperating condenser 11 are connected in series with each other across the mains 2 and 3, and in a similar manner another inductance-coil 12 and its coöperating condenser 13 are also connected in series across the mains, but are arranged reversely with respect to the first set. Thus the condenser 13 of one set and the inductance-coil 10 of the other set have their terminals connected to the same main, while the remaining reactances, consisting of the inductance-coil 12 of one set and the condenser 11 of the other set, have a terminal of each connected together to the other main. Each set is thus connected in parallel with the other set, so that the lagging current which would be produced by the one set under certain conditions of operation compensates for the leading current in the other set. The constant-current circuits for each set of reactances might be arranged separately with respect to each other; but it is convenient, however, to combine the two circuits, so as to form a single circuit extending between a point in the circuit connecting the reactances of one set and a point connecting the reactances of the other set. The connection of the constant-current circuit (here represented at 14) is therefore made between the points 15 and 16.

The elements thus far described in connection with Fig. 2 are already known to the art, but constitute a system which in many respects is impracticable, because it is extremely sensitive to harmonics in the alternating-current wave. Thus it will be seen that there is a path for current, say, from the main 2 through the condenser 11, through the circuit 14, and then through the condenser 13 to the other main 3. There is also a parallel path for current from the main 2 through the inductance-coil 12, then through the constant-current circuit 14, and back to the main 3 through the remaining inductance-coil 10. The consequence of this arrangement is that the higher harmonics in the alternating-current wave choose the path through the condensers, while the lower or fundamental waves select the path through the inductances. The higher harmonics being thus magnified by the condensers at the expense of the lower harmonics there is no longer the proper coöperating action of the condensers and inductance-coils upon a given wave such as to produce at all loads a constant current in the consumption-circuit. The arrangement thus described is therefore under ordinary conditions of operation exceedingly unsatisfactory, if not impracticable. To remedy this objection, I insert in circuit with each of the condensers a small inductance-coil to damp out the harmonics in the current flowing through the condenser. Thus in series with the condenser 13 is a relatively small inductance-coil 17, while in series with the remaining condenser 11 is a relatively small inductance-coil 18. To compensate for the effect of these small inductance-coils, the capacity of each condenser is slightly increased by a proper amount, as will be readily understood by one skilled in the art. The system then becomes independent of wave shape and is transformed from the impracticable to the practical.

What I claim as new, and desire to secure by Letters Patent of the United States, is—

1. The combination of constant-potential mains, a combination of reactances of opposite sign for deriving current of constant value from said mains, and an inductance-coil in series with one of said reactances possessing capacity.

2. The combination of a source of alternating current of constant potential, a combination of reactances of opposite sign for deriving from such source a current of constant value, and means in circuit with a reactance or reactances of one sign for suppressing harmonics.

3. The combination of constant-potential mains, a constant-current circuit, a combination of devices possessing capacity and inductance for transferring energy between the constant-potential circuit and the constant-current circuit, and means for preventing the device or devices possessing capacity from magnifying harmonics in the alternating current flowing in either the constant-potential circuit or the constant-current circuit.

In witness whereof I have hereunto set my hand this 27th day of May, 1902.

MATTHEW O. TROY.

Witnesses:
DUGALD McK. McKILLOP,
JOHN J. WALKER.